(No Model.) 2 Sheets—Sheet 1.
A. B. PENTON
BICYCLE CANOPY.
No. 533,371. Patented Jan. 29, 1895.
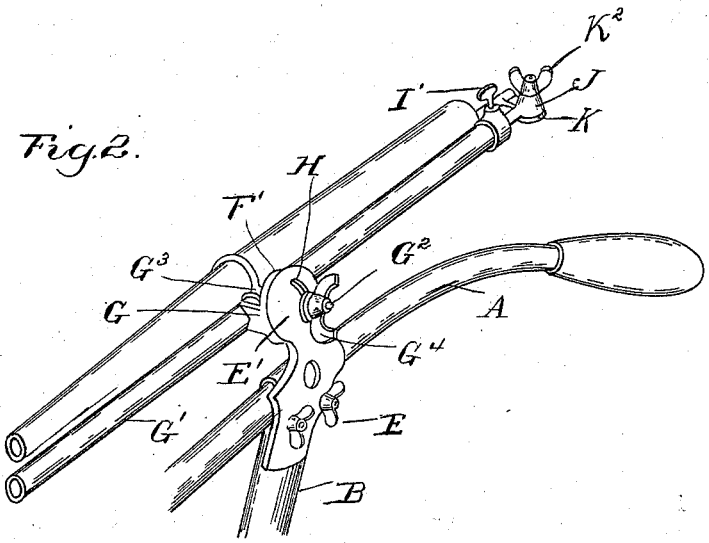
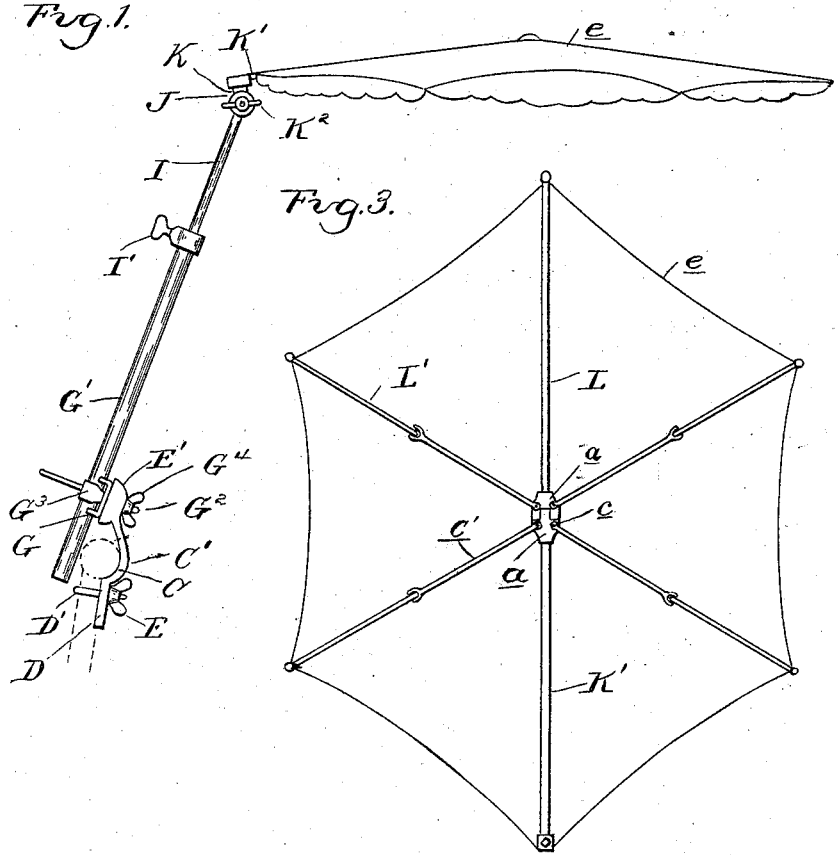
Witnesses
A. L. Nabbie
Otto F. Barthel
Inventor
Alfred B. Penton
By Mrs. A. Spragues
Attys.

(No Model.) 2 Sheets—Sheet 2.
A. B. PENTON.
BICYCLE CANOPY.
No. 533,371. Patented Jan. 29, 1895.
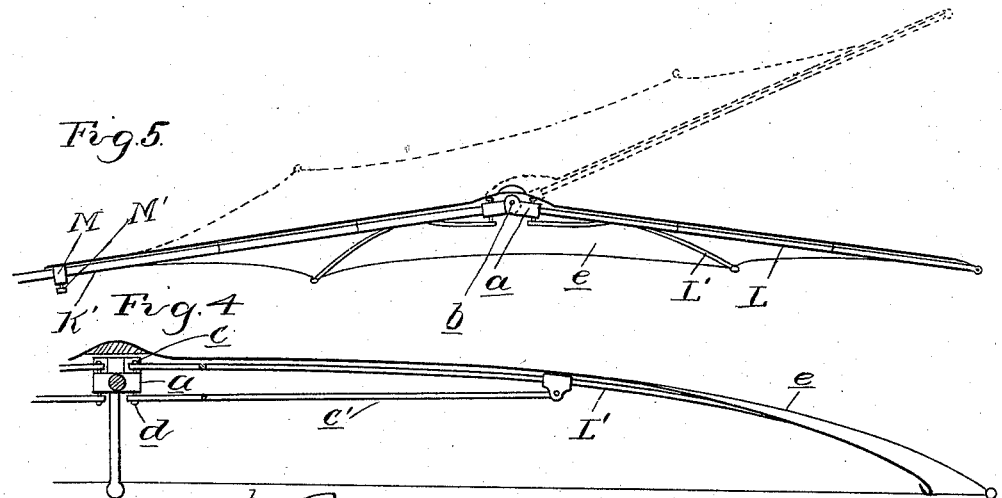
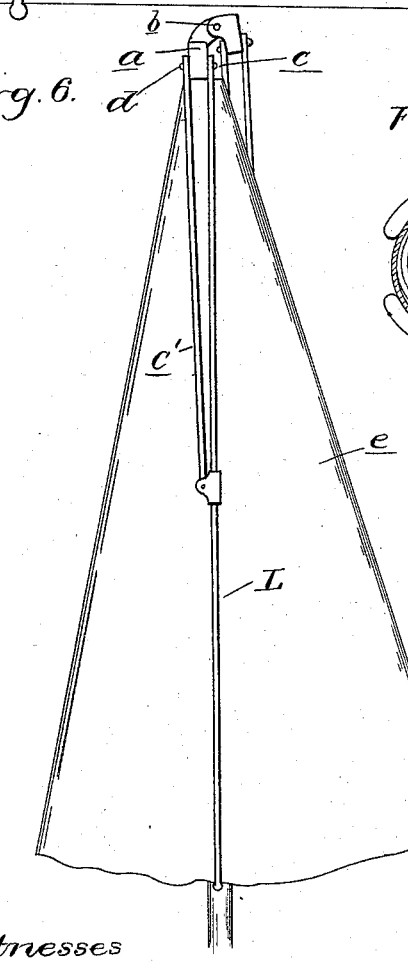
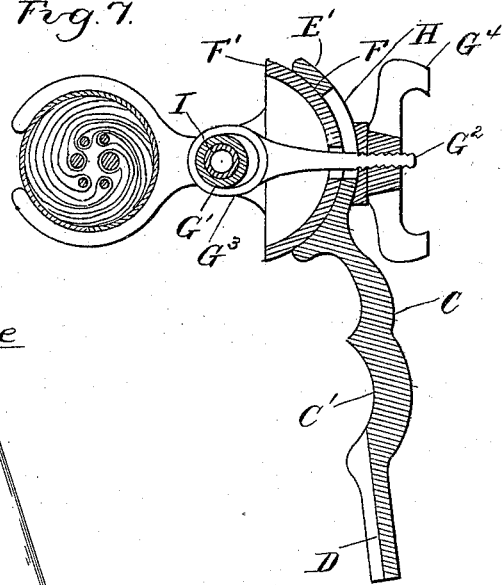
Witnesses
Inventor
Alfred B. Penton

UNITED STATES PATENT OFFICE.

ALFRED B. PENTON, OF DETROIT, MICHIGAN, ASSIGNOR TO THE BANNER CYCLE CANOPY CO., OF SAME PLACE.

BICYCLE-CANOPY.

SPECIFICATION forming part of Letters Patent No. 533,371, dated January 29, 1895.

Application filed August 26, 1893. Serial No. 484,145. (No model.)

*To all whom it may concern:*

Be it known that I, ALFRED B. PENTON, a subject of the Queen of Great Britain, residing at Detroit, in the county of Wayne and State of Michigan, have invented certain new and useful Improvements in Bicycle-Canopies, of which the following is a specification, reference being had therein to the accompanying drawings.

The invention consists in the peculiar construction of the canopy or umbrella, further in the construction of its support, further in the construction of its support when not in use, and further in the construction, arrangement and combination of the various parts, all as more fully hereinafter described.

In the drawings, Figure 1 is a side elevation of my device as applied in use. Fig. 2 is a perspective view of the device as stored when not in use. Fig. 3 is a bottom plan view of the canopy extended. Fig. 4 is a longitudinal section through the canopy extended. Fig. 5 is a similar section showing the parts turned as in the act of folding it to its closed position. Fig. 6 is a plan of the canopy closed. Fig. 7 is a vertical, central, cross-section through Fig. 2.

A shows the handle bar of a bicycle. B is the standard thereof.

C is the supporting plate having the curved horizontal bearing C' adapted to embrace the handle bar, and a curved vertical bearing D adapted to bear against the standard B, and secured by a staple D' passing over the standard, and passing through apertures in the plate, suitable winged nuts E serving to clamp it in position. This plate carries a head E' having a ball socket F in which the curved disk or ball F' engages. The ball or disk F' has at its edge the notched ears G.

G' is a tubular standard adapted to be clamped against the ears G, by means of the clamping bolt $G^2$ which is provided with a sleeve $G^3$ encircling said standard.

$G^4$ is a winged nut on the outside of the head E' for clamping the parts together. The bolt $G^2$ engages in the vertical slot H in the head E' so that the standard may have an angular adjustment in relation to the head.

I is a rod telescoping in the tube G' and forming a complementary portion of the standard.

I' is a set screw for holding the two parts of the telescopic standard at any point of extension. At the top the rod I is provided with a bearing plate J to which is swiveled a complementary bearing plate K extending at an angle from the rib K' of the canopy.

The bearing plates J and K are secured together by means of a bolt having a winged nut $K^2$ on one end to clamp the plates in any desired angle.

The canopy consists of two main ribs K' and L, each of which is secured to the block a, centrally of the canopy, the two blocks a being hinged together by means of a suitable hinged pin b. The side ribs L' of which I have shown two, on each side of the main ribs, are pivoted by vertical pivots c to the respective blocks a. For the purpose of strength, I usually bifurcate the ribs or employ braces c' secured centrally of the ribs and extending to the under side of the blocks, the pivot point d passing therethrough as well as through the ribs.

e is a cover which is tightly secured to the ribs in the usual manner.

The parts being thus constructed their operation is as follows: The clamping nut $G^4$ being loosened and the tube G' being turned to its vertical position and set at the desired angle in relation to the ground, the operator tightens up the nut $G^4$, clamping the standard in position. The extension I thereof may then be drawn out to the desired distance and secured by means of the set screw I', the canopy is adjusted at the desired angle to the standard by means of the clamping device J, and the canopy may then be spread. To spread the umbrella, the operator takes hold of the outer end of the rib L and turns the outer half or section of the umbrella about the pivot point b until the rib L is substantially in line with the rib K', or in the position shown in dotted lines in Fig. 5. Then a further downward movement of the rib L will cause that rib to pass beyond the line of the rib K' and into the position shown in full lines in Fig. 5, in which position it will be held by the tension of the cloth, being prevented from collapsing by engagement of the opposing shoulders of the hub sections or blocks *a*.

As the cloth covering of the canopy is apt to be stretched, I provide means on the rib K' for adjusting the tension of the cover, such for instance as the collar M slidingly secured on the rib by means of a set screw M', the end of the cover being secured to the collar. By adjusting this collar under the rib the covering of the canopy may be kept tight at all times.

What I claim as my invention is—

1. In a canopy, the combintion with the two oppositely extending supporting ribs pivotally united at their inner ends and free to swing vertically upward above the plane of the pivot, side ribs pivotally supported by the supporting ribs and having a horizontal swinging movement, a cover for the canopy, and a standard, substantially as described.

2. In a canopy, the combination with two ribs L and K' extending out in opposite directions, blocks *a* on the adjacent ends of the ribs, a horizontal pin pivotally uniting the blocks, a series of side ribs L', vertical pivots securing the side ribs to the blocks, a cover, and a standard, substantially as described.

3. In a canopy, the combination with two ribs L and K' extending out in opposite directions, blocks *a* on the adjacent ends of the ribs, a horizontal pin pivotally uniting the blocks, a series of side ribs L' having braces *c'*, vertical pivots securing the side ribs and braces to the blocks, a cover, and a standard, substantially as described.

In testimony whereof I affix my signature in presence of two witnesses.

ALFRED B. PENTON.

Witnesses:
M. B. O'DOGHERTY,
OTTO F. BARTHEL.